United States Patent
Yasui et al.

(10) Patent No.: US 11,397,322 B2
(45) Date of Patent: Jul. 26, 2022

(54) IMAGE PROVIDING SYSTEM FOR VEHICLE, SERVER SYSTEM, AND IMAGE PROVIDING METHOD FOR VEHICLE

(71) Applicant: HONDA MOTOR CO., LTD., Tokyo (JP)

(72) Inventors: Yuji Yasui, Wako (JP); Hisao Asaumi, Wako (JP); Shion Tokunaga, Wako (JP); Masashi Yuki, Wako (JP); Yo Ito, Tokyo (JP); Hirotaka Uchitomi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 16/620,914

(22) PCT Filed: Jun. 12, 2018

(86) PCT No.: PCT/JP2018/022435
§ 371 (c)(1),
(2) Date: Dec. 10, 2019

(87) PCT Pub. No.: WO2018/230563
PCT Pub. Date: Dec. 20, 2018

(65) Prior Publication Data
US 2020/0159014 A1     May 21, 2020

(30) Foreign Application Priority Data
Jun. 16, 2017    (JP) .............................. JP2017-118918

(51) Int. Cl.
*G09G 5/00*      (2006.01)
*G02B 27/01*    (2006.01)
(Continued)

(52) U.S. Cl.
CPC ......... *G02B 27/0101* (2013.01); *B60N 2/002* (2013.01); *B60R 1/00* (2013.01);
(Continued)

(58) Field of Classification Search
CPC ....................................................... G06F 3/011
See application file for complete search history.

(56) References Cited

U.S. PATENT DOCUMENTS

2012/0293506 A1* 11/2012 Vertucci ................... G06N 3/04
345/419
2017/0013188 A1* 1/2017 Kothari ..................... B60R 1/00

FOREIGN PATENT DOCUMENTS

JP    2000-244886    9/2000
JP    2003-069471    3/2003
(Continued)

OTHER PUBLICATIONS

International Search Report and Written Opinion for International Application Serial No. PCT/JP2018/022435 dated Aug. 28, 2018, 8 pages.

(Continued)

*Primary Examiner* — Nan-Ying Yang
(74) *Attorney, Agent, or Firm* — Amin, Turocy & Watson, LLP

(57) ABSTRACT

An image providing system for vehicles includes an imaging unit; a display unit which generates a virtual image of a person; a communication unit which connects for communication to an apparatus outside a vehicle; and a seat occupancy detection unit which detects a seat occupancy state in the vehicle, wherein the display unit controls a display mode of the virtual image on the basis of the seat occupancy state in the vehicle detected by the seat occupancy detection unit in an operating state of the communication unit.

1 Claim, 10 Drawing Sheets

(51) Int. Cl.
  *B60N 2/00*      (2006.01)
  *B60R 1/00*      (2022.01)
(52) U.S. Cl.
  CPC ....... *B60R 2300/10* (2013.01); *B60R 2300/20* (2013.01); *G02B 2027/014* (2013.01); *G02B 2027/0141* (2013.01)

(56) References Cited

FOREIGN PATENT DOCUMENTS

| | | |
|---|---|---|
| JP | 2011-075848 | 4/2011 |
| JP | 2017-030737 | 2/2017 |
| JP | 2017-512027 | 4/2017 |
| WO | 2012-033095 | 3/2012 |
| WO | 2015-136152 | 9/2015 |

OTHER PUBLICATIONS

Japanese Office Action for Japanese Patent Application No. 2020-007766 dated Jun. 14, 2022.

* cited by examiner

IMAGE PROVIDING SYSTEM FOR VEHICLE, SERVER SYSTEM, AND IMAGE PROVIDING METHOD FOR VEHICLE

TECHNICAL FIELD

The present invention relates to an image providing system for vehicles, a server system and an image providing method for vehicles.

Priority is claimed on Japanese Patent Application No. 2017-118918, filed Jun. 16, 2017, the content of which is incorporated herein by reference.

BACKGROUND ART

Conventionally, automated driving in which at least one of speed control and steering control is performed automatically has been researched. With respect to this, a technology for displaying an image with depth such that a viewer can perceive depth has been developed (refer to Patent Literature 1, for example).

CITATION LIST

Patent Literature

[Patent Literature 1]
Japanese Unexamined Patent Application, First Publication No. 2017-30737

SUMMARY OF INVENTION

Technical Problem

This conventional technology does not consider causing an occupant inside a vehicle and a person outside the vehicle to feel as if they are together.

An object of the present invention devised in view of the aforementioned circumstances is to provide an image providing system for vehicles, a server system and an image providing method for vehicles which can cause an occupant inside a vehicle and a person outside the vehicle to feel as if they are together.

Solution to Problem (1): An image providing system for vehicles includes: an imaging unit; a display unit which generates a virtual image of a person; a communication unit which connects for communication to an apparatus outside a vehicle; and a seat occupancy detection unit which detects a seat occupancy state in the vehicle, wherein the display unit controls a display mode of the virtual image on the basis of the seat occupancy state in the vehicle detected by the seat occupancy detection unit in an operating state of the communication unit.

(2): In (1), the image providing system may include a connection state detection unit which detects a connection state between an apparatus outside the vehicle and the communication unit, and a transmission permission unit which permits transmission of an image captured by the imaging unit on the basis of the connection state detected by the connection state detection unit, wherein the communication unit transmits the image captured by the imaging unit to the apparatus outside the vehicle when the transmission permission unit permits transmission.

(3): In (1) or (2), the display unit may generate a virtual image on a mirror or a window of the vehicle.

(4): In any one of (1) to (3), the display unit may be made to correspond to a vacant seat in the vehicle and generate a virtual image on the basis of the seat occupancy state in the vehicle detected by the seat occupancy detection unit.

(5): In any one of (1) to (4), the virtual image displayed by the display unit may be a real-time image captured in a place other than the vehicle.

(6): In any one of (1) to (4), the virtual image displayed by the display unit is a model image.

(7): In any one of (1) to (4), the virtual image displayed by the display unit is an image captured and recorded in advance.

(8) In any one of (1) to (7), a streaming image is generated on the basis of at least some of data of an image captured by the imaging unit.

(9) In any one of (1) to (8), the image providing system further includes a control unit which remotely operates the imaging unit on the basis of a movement of a line of sight of a user of the apparatus outside the vehicle detected by a line-of-sight sensor of a head mount display device worn by the user.

(10): A server system configured to connect for communication to a communication unit of a vehicle including an imaging unit, a display unit which generates a virtual image of a person, and the communication unit which connects for communication to an apparatus outside the vehicle, the server system including: a first communication unit which connects for communication to the apparatus outside the vehicle; a second communication unit which connects to the communication unit of the vehicle; a first storage unit which stores information transmitted from the apparatus outside the vehicle; a second storage unit which stores ID information of the vehicle and an image acquired by the imaging unit; and a first conversion unit which selectively transmits the information held by the first storage unit to the second communication unit, wherein the first conversion unit includes a virtual image generation unit which generates a virtual image to be displayed on the display unit.

(11): In (10), the second storage unit is configured to further store information on a seat occupancy state in the vehicle acquired from the second communication unit, and the first conversion unit controls the virtual image generation unit on the basis of the information on the seat occupancy state.

(12): In (11), the server system includes a second conversion unit which selectively transmits the information on the seat occupancy state stored by the second storage unit to the first communication unit, wherein the second conversion unit includes a person image extraction unit which extracts image information corresponding to a specific occupant of the vehicle from the information on the seat occupancy state stored by the second storage unit.

(13): An image providing method for vehicles, using a computer, includes: performing processing of imaging an occupant of a vehicle; performing processing of generating a virtual image of a person in the vehicle; performing processing of connecting for communication to an apparatus outside the vehicle; performing processing of detecting a seat occupancy state in the vehicle; and performing processing of controlling a display mode of the virtual image on the basis of a seat occupancy state in the vehicle detected during connection for communication.

Advantageous Effects of Invention

According to (1), (10) or (13), an occupant inside a vehicle and a person outside the vehicle can feel as if they are together.

According to (2), it is possible to avoid a situation in which transmission of an image is attempted in spite of a poor communication connection state.

According to (3), it is possible to cause an occupant inside a vehicle and a person outside the vehicle to feel as if they are together by using a mirror or a window provided in the vehicle.

According to (4), it is possible to cause an occupant inside a vehicle and a person outside the vehicle to feel as if they are together by using a seat provided in the vehicle.

According to (5), it is possible to augment a feeling of an occupant inside a vehicle and a person outside the vehicle as if they are together by displaying, in the vehicle, a real-time image captured in a place other than the vehicle.

According to (6) or (7), it is possible to cause an occupant inside a vehicle and a person outside the vehicle to feel as if they are together even when a communication connection state between the vehicle and an apparatus outside the vehicle is poor.

According to (8), it is possible to generate a streaming image even when a communication connection state between the vehicle and an apparatus outside the vehicle is poor.

According to (9), it is possible to improve satisfaction of a user of an apparatus outside a vehicle because the user of the apparatus outside the vehicle can remotely operate an imaging unit of the vehicle.

According to (11), it is possible to generate, in a vehicle, a virtual image suitable for a seat occupancy state in the vehicle.

According to (12), it is possible to extract an appropriate image from images captured by an imaging unit and transmit the extracted image to an apparatus outside a vehicle.

BRIEF DESCRIPTION OF DRAWINGS

FIG. 9 is a sequence diagram for explaining processing of displaying a streaming image of an image of a first user or the like.

DESCRIPTION OF EMBODIMENTS

Hereinafter, an embodiment of an image providing system for vehicles, a server system and an image providing method for vehicles of the present invention will be described with reference to the drawings. The image providing system for vehicles is a system for mutually providing an image of an occupant of a vehicle, or the like and an image of a user other than the occupant of the vehicle who has a specific relationship with the occupant of the vehicle. The vehicle in which the occupant rides is, for example, an autonomous vehicle which basically does not require driving operations. Although it is assumed that the occupant rides in an autonomous vehicle in the following description, the occupant may ride in a manual driving vehicle.

[Overall Configuration]

Figure 1:
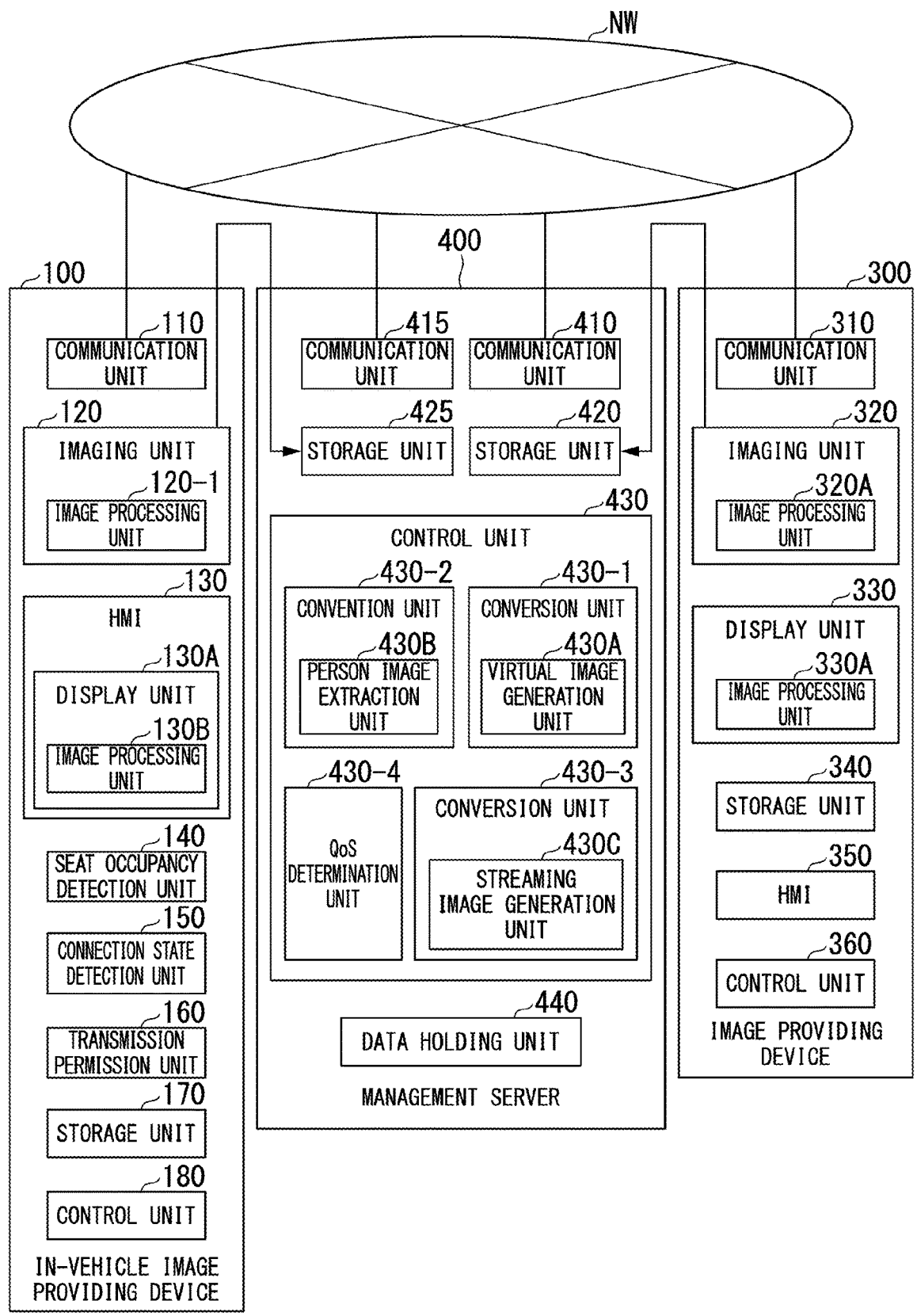
FIG. 1 is a diagram illustrating a configuration of an image providing system.

FIG. 1 is a diagram illustrating a configuration of an image providing system 1. The image providing system 1 includes, for example, an in-vehicle image providing device 100 mounted in a vehicle, an image providing device 300 disposed in a place other than the vehicle, and a management server 400. These components can communicate with one another through a network NW. The network NW includes the Internet, a wide area network (WAN), a local area network (LAN), a public line, a provider device, a leased line, a wireless base station, etc.

[In-Vehicle Image Providing Device]

The in-vehicle image providing device 100 includes, for example, a communication unit 110, an imaging unit 120, a human machine interface (HMI) 130, a seat occupancy detection unit 140, a connection state detection unit 150, a transmission permission unit 160, a storage unit 170, and a control unit 180.

The communication unit 110 is, for example, a wireless communication module for connecting to the network NW or directly communicating with other vehicles or terminal devices of pedestrians. The communication unit 110 performs wireless communication on the basis of Wi-Fi, dedicated short range communications (DSRC), Bluetooth (registered trademark) or other communication standards. A plurality of communication units corresponding to purposes may be provided as the communication unit 110. In addition, the communication unit 110 performs communication with apparatuses (e.g., the image providing device 300, the management server 400, and the like) outside the vehicle through the network NW.

The imaging unit 120 is, for example, a CCD camera, a CMOS camera, or the like. For example, the imaging unit 120 may repeatedly perform imaging in a predetermined period and transmit images to the management server 400 through the communication unit 110 and the network NW. Further, the imaging unit 120 includes an image processing unit 120-1. The image processing unit 120-1 performs data processing of an image captured by the imaging unit 120.

Figure 2:
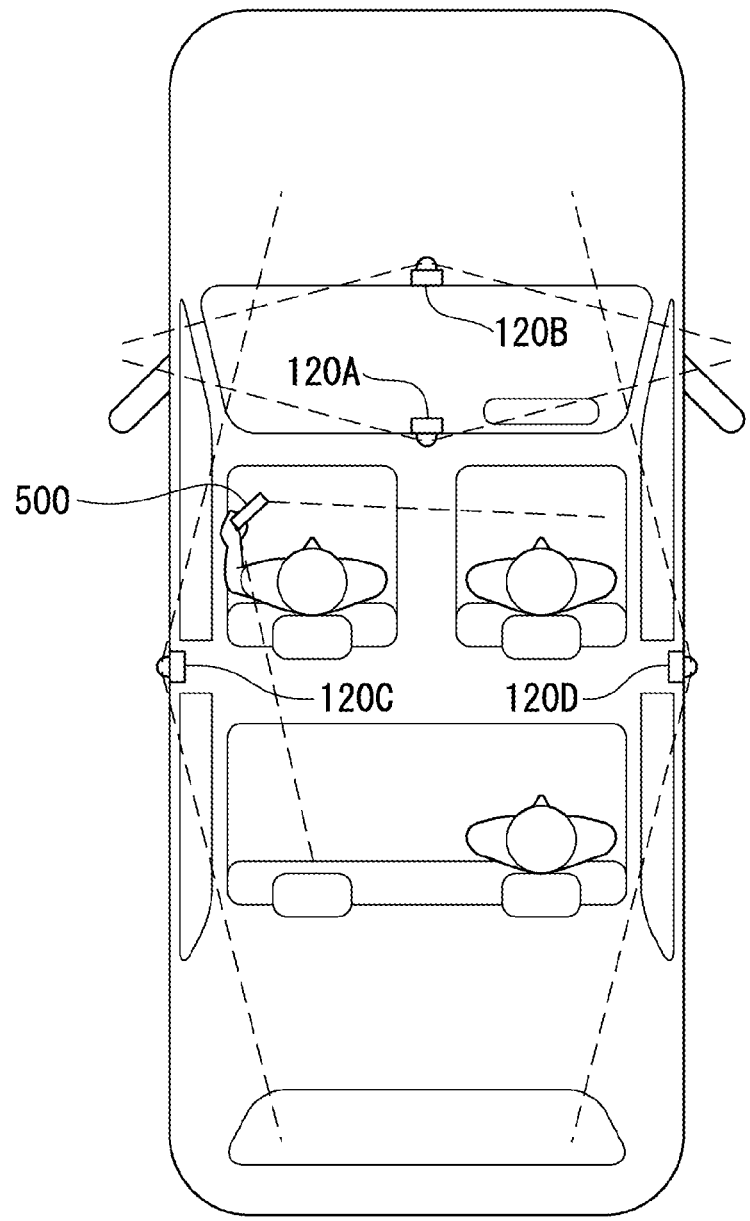
FIG. 2 is a diagram illustrating an example of an imaging unit.

FIG. 2 is a diagram illustrating an example of the imaging unit 120. The imaging unit 120 includes, for example, four in-vehicle cameras including an in-vehicle camera 120A for imaging the inside of the vehicle and in-vehicle cameras 120B, 120C and 120D for imaging outside of the vehicle. In another example, the imaging unit 120 may include less than four or five or more in-vehicle cameras.

As illustrated in FIG. 2, the in-vehicle camera 120A for imaging the inside of the vehicle images occupants inside the vehicle. The in-vehicle camera 120B for imaging outside of the vehicle images the view in front of the vehicle and the in-vehicle cameras 120C and 120D for imaging outside of the vehicle image side views from the vehicle. A panorama image, a spherical image and the like may be generated by combining images of these in-vehicle cameras 120B, 120C and 120D for imaging outside of the vehicle The in-vehicle camera 120A for imaging the inside of the vehicle and the in-vehicle cameras 120B, 120C and 120D for imaging outside of the vehicle may be detachable. Particularly, when they are disposed inside the vehicle, a camera in a mascot form may be disposed near a headrest in an unoccupied seat.

In addition, the imaging unit 120 may be a portable terminal device 500 carried by an occupant of the vehicle, for example. Data of an image captured by a camera of the portable terminal device 500 may be transmitted to the in-vehicle image providing device 100 through ad-hoc connection and transmitted to the management server 400 through the communication unit 110 and the network NW like an image captured by each in-vehicle camera or may be transmitted to the management server 400 through the network NW without passing through the in-vehicle image providing device 100.

Referring back to FIG. 1, the HMI 130 includes, for example, a touch panel type display device, a speaker, a microphone, and the like. The HMI 130 receives an image providing service starting operation or the like performed by a first user. In addition, the HMI 130 includes a display unit 130A. The display unit 130A generates a virtual image of a person. Specifically, the display unit 130A displays a virtual image of a user located in a place other than the vehicle in the form of an optical illusion of the user being located inside the vehicle on the basis of data received from the management server 400. The user is a user of an image providing service user having a specific relation (e.g., a parent-child relation, a grandparent-grandchild relation, or the like) with an occupant in the vehicle. Hereinafter, an occupant in the vehicle is referred to as a "first user" and a user other than the occupant of the vehicle is referred to as a "second user." The display unit 130A is, for example, a projection device which projects a virtual image of the second user to a mirror, a window, a seat, or the like. In addition, the display unit 130A includes an image processing unit 130B. The image processing unit 130B performs processing of data of an image for causing the display unit 130A to generate a virtual image.

Figure 3:
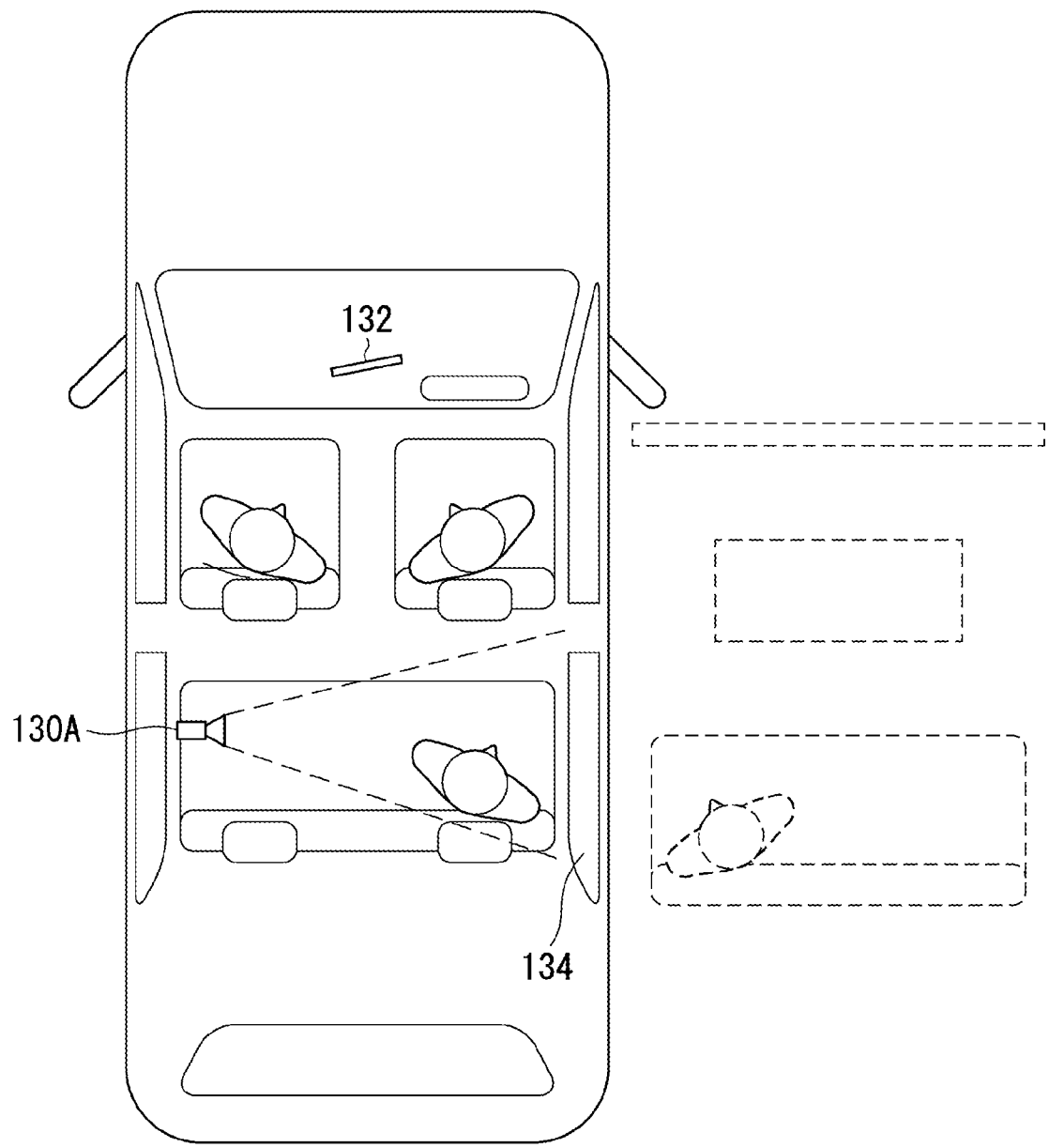
FIG. 3 is a diagram illustrating an example of a display unit.

FIG. 3 is a diagram illustrating an example of the display unit 130A. The display unit 130A is a projection device which projects an imaginary image as an example of a virtual image to a mirror 132 and/or a window 134, for example. In the example of FIG. 3, the display unit 130A projects an imaginary image of the second user to the window 134. Further, when the first user (an occupant of the vehicle) views the window 134, the first user is reflected thereon. Accordingly, when the first user views the window 134 on which the image of the first user and the imaginary image of the second user are reflected, the first user can feel as if he/she is riding in the vehicle with the second user located in a place other than the vehicle (optical illusion). That is, the first user who views the imaginary image of the second user can feel as if the vehicle cabin is connected to a room of the house of the second user represented by dotted lines in FIG. 3 (i.e., becomes an expanded space).

The display unit 130A may be an optically transparent display device provided on the surface of the mirror 132 or the window 134. In this case, the display unit 130A is formed in such a manner that, for example, a liquid crystal display or an organic electroluminescence (EL) display device is attached to or embedded in the mirror 132 or the window 134. The display unit 130A may be a combination of a projection device and a display device. In this case, the display device is provided at a projection destination (the mirror 132 or the window 134) of the projection device and performs an optical operation such that an image projected by the projection device is easily seen.

Figure 4:
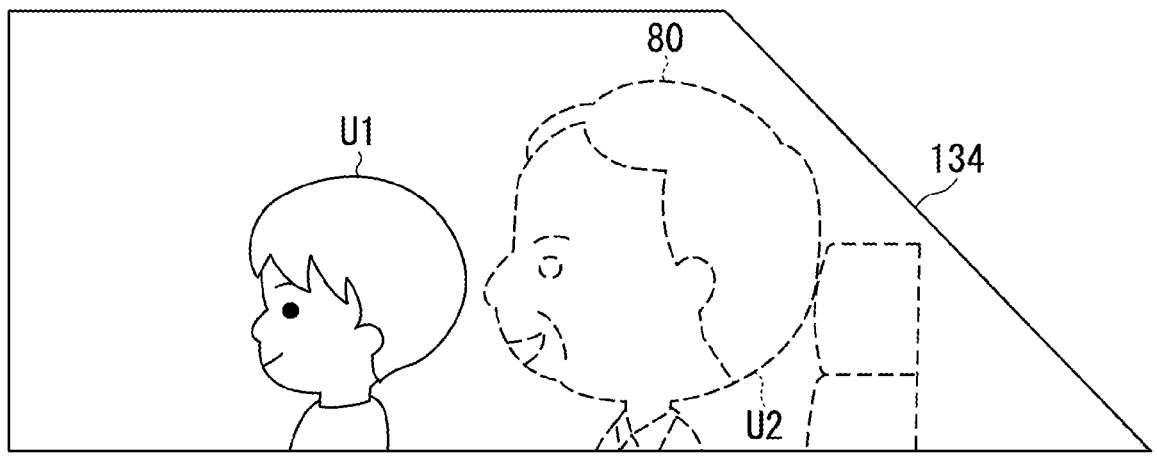
FIG. 4 is a diagram illustrating a state in which an imaginary image of a second user is displayed on a window.

FIG. 4 is a diagram illustrating a state in which an imaginary image 80 of a second user U2 is displayed on the window 134. As illustrated, when a first user U1 views the window 134, an image of the first user U1 and the imaginary image 80 of the second user U2 represented by dotted lines are viewed as if they are reflected in the window 134. Accordingly, the first user U1 can feel as if he/she is riding in the vehicle with the second user U2 located in a place other than the vehicle.

Figure 5:
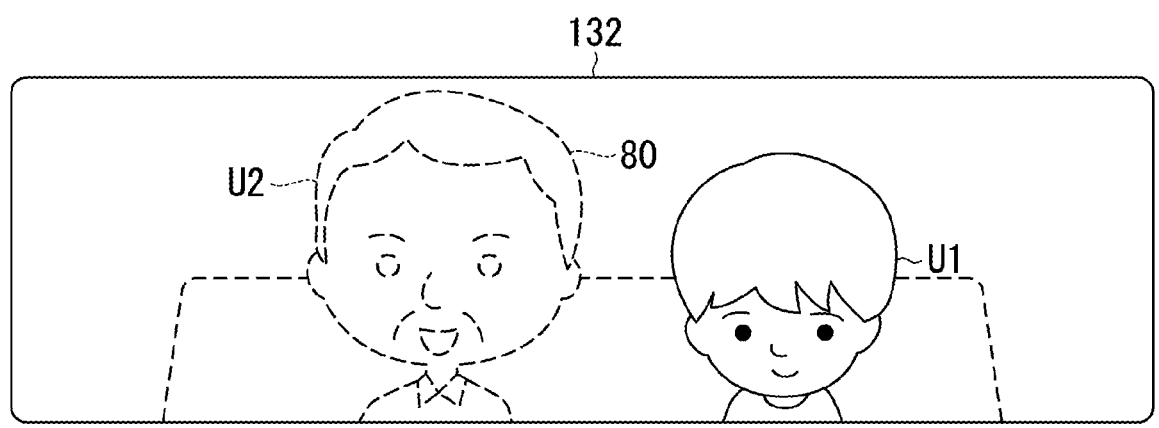
FIG. 5 is a diagram illustrating a state in which an imaginary image of the second user is displayed on a mirror.

FIG. 5 is a diagram illustrating a state in which the imaginary image 80 of the second user U2 is displayed on the mirror 132. As illustrated, when the first user U1 views the mirror 132, the image of the first user U1 and the imaginary image 80 of the second user U2 represented by dotted lines are viewed as if they are reflected in the mirror 132. Accordingly, the first user U1 can feel as if he/she is riding in the vehicle with the second user U2 located in a place other than the vehicle.

The display unit 130A may be configured to be able to display the imaginary image 80 of the second user U2 on any of the mirror 132 and the window 134. On the other hand, the display unit 130A may be configured to be able to display the imaginary image 80 of the second user U2 on only one of the mirror 132 and the window 134 as another example.

Figure 6:
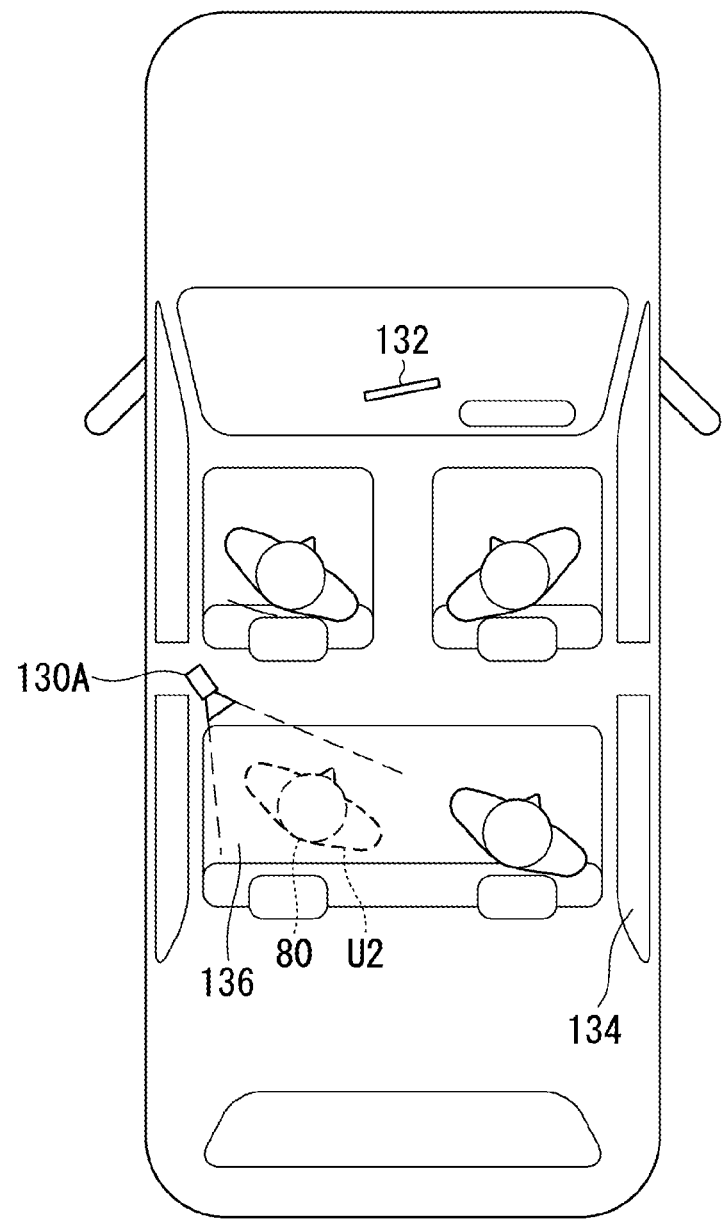
FIG. 6 is a diagram illustrating another example of the display unit.

FIG. 6 is a diagram illustrating another example of the display unit 130A. For example, the display unit 130A may be a projection device to which, for example, a holography technique is applied which projects the imaginary image 80 as an example of a virtual image such that it is made to corresponds to a vacant seat of seats 136 in the vehicle. When the first user (an occupant of the vehicle) views a vacant seat, the imaginary image 80 of the second user U2 is viewed as if the second user U2 is sitting on the vacant seat. Accordingly, the first user can feel as if he/she is riding in the vehicle with the second user U2 located in a place other than the vehicle (optical illusion) when viewing the vacant seat. In addition, the display unit 130A changes a position at which the imaginary image 80 of the second user U2 is generated depending on the presence or absence of a vacant seat, for example, on the basis of an imaging result of the in-vehicle camera 120A for imaging the inside of the vehicle. As described above, the display unit 130A generates a virtual image corresponding to a vacant seat of the seats 136 in the vehicle. That is, the display unit 130A can not only generate a virtual image on a vacant seat but can also generate a virtual image such that the virtual image is overlaid on a person in the vehicle, a structure or the like.

Referring back to FIG. 1, the seat occupancy detection unit 140 detects a seat occupancy state in the vehicle. The seat occupancy detection unit 140 detects a seat occupancy state in the vehicle (whether an occupant is sitting on a seat), for example, on the basis of an output of a sitting sensor. The seat occupancy detection unit 140 may detect a seat occupancy state in the vehicle on the basis of an image captured (acquired) by the imaging unit 120. The above-described display unit 130A generates a virtual image of a person on the basis of a seat occupancy state in the vehicle detected by the seat occupancy detection unit 140. For example, when an occupant is sitting only on the back seat during automated driving of the vehicle, the display unit 130A generates a virtual image of a person on the side of the back seat on the basis of a seat occupancy state (state in which the occupant is sitting only on the back seat) in the vehicle detected by the seat occupancy detection unit 140. For example, when an occupant is sitting only on the right seat, the display unit 130A generates a virtual image of a person on the side of the right seat on the basis of a seat occupancy state (state in which the occupant is sitting only on the right seat) in the vehicle detected by the seat occupancy detection unit 140. Specifically, the display unit 130A controls a display mode of a virtual image on the basis of a seat occupancy state in the vehicle detected by the seat occupancy detection unit 140 in an operation state of the communication unit 110 (i.e., a state in which the communication unit 110 can receive data for generating a virtual image from the management server 400). Information on a seat occupancy state in the vehicle detected by the seat occupancy detection unit 140 is transmitted by the communication unit 110 to the management server 400 and the like.

The connection state detection unit 150 detects a connection state between the communication unit 110 and an apparatus (e.g., the image providing device 300, the management server 400 or the like) outside the vehicle. That is, the connection state detection unit 150 detects, for example, whether a connection state is a state in which data for generating a virtual image is easily received from the management server 400. In addition, the connection state detection unit 150 detects, for example, whether the connection state is a state in which data of an image captured by the imaging unit 120 is easily transmitted to an apparatus outside the vehicle.

The transmission permission unit 160 permits transmission of an image captured by the imaging unit 120 on the basis of a connection state detected by the connection state detection unit 150. Specifically, when the connection state detection unit 150 detects a poor connection state between the transmission unit 110 and an apparatus (e.g., the image providing device 300, the management server 400 or the like) outside the vehicle, the transmission permission unit 160 does not permit transmission of an image captured by the imaging unit 120. That is, in the case of a poor connection state between the transmission unit 110 and the apparatus outside the vehicle, the communication unit 110 preferentially performs reception of data necessary to generate a virtual image rather than transmission of an image captured by the imaging unit 120. That is, the transmission permission unit 160 prefers reception to transmission when a communication band is restricted (when a connection state is poor). The communication unit 110 transmits an image captured by the imaging unit 120 to an apparatus outside the vehicle when transmission permission unit 160 permits transmission.

The storage unit 170 is realized by a hard disk drive (HDD), a flash memory, a random access memory (RAM), a read only memory (ROM), or the like. The storage unit 170 stores information received from the management server 400, data of images captured by the imaging unit 120, data of an imaginary image of the second user U2 displayed by the display unit 130A, and the like.

The control unit 180 is realized, for example, by a processor such as a central processing unit (CPU) executing a program. When the first user inputs an image providing service starting operation to the HMI 130 to start an application program (image providing application) for using the image providing system 1, the control unit 180 outputs a control signal for causing the communication unit 110 to perform data transmission to the management server 400, a control signal for causing the imaging unit 120 to perform imaging, a control signal for causing the display unit 130A to display an imaginary image of the second user U2, and the like.

[Image Providing Device]

The image providing device 300 includes, for example, a communication unit 310, an imaging unit 320, a display unit 330, a storage unit 340, an HMI 350, and a control unit 360.

The communication unit 310 is, for example, a communication module for connecting to the network NW or directly communicating with a portable terminal device of the second user, or the like. The communication unit 310 performs communication on the basis of Wi-Fi, DSRC, Bluetooth or other communication standards. A plurality of communication units corresponding to purposes may be provided as the communication unit 310. In addition, the communication unit 310 performs communication with the management server 400 through the network NW.

The imaging unit 320 is, for example, a CCD camera, a CMOS camera, or the like. The imaging unit 320 images the second user U2 and transmits data of a captured image of the second user U2 to the management server 400 through the communication unit 310 and the network NW. Further, the imaging unit 320 includes an image processing unit 320A. The image processing unit 320A performs processing of data of an image captured by the imaging unit 320.

The display unit 330 displays a streaming image of an image of the first user U1 or the like captured by the imaging unit 120 on the basis of data received from the management server 400. In addition, the display unit 330 includes an image processing unit 330A. The image processing unit 330A performs processing of data of an image for displaying the streaming image by the display unit 330.

Figure 7:
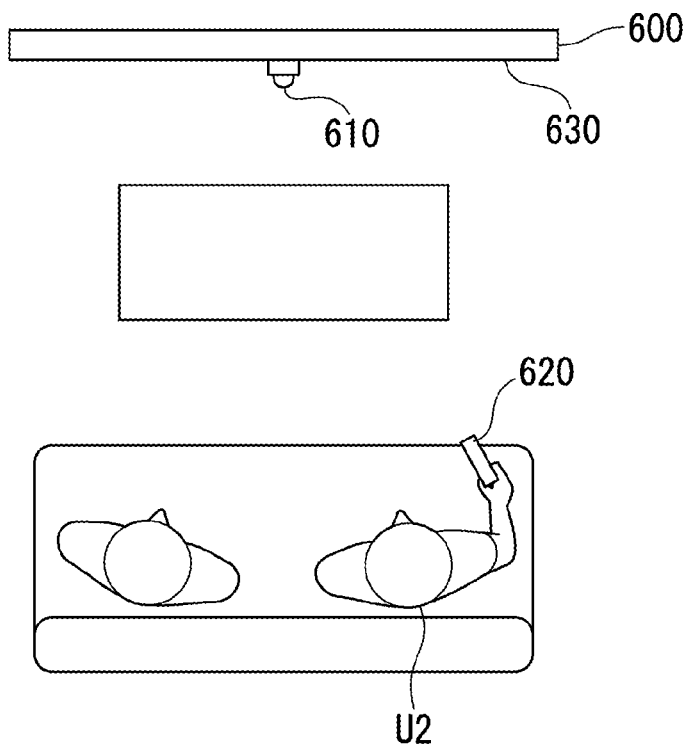
FIG. 7 is a diagram illustrating an example of an imaging unit and a display unit of an image providing device.

FIG. 7 is a diagram illustrating an example of the imaging unit 320 and the display unit 330 of the image providing device 300. The imaging unit 320 is, for example, a camera 610 included in a large-screen TV 600 placed in the house of the second user U2. The imaging unit 320 images the second user U2. The imaging unit 320 may be, for example, a camera of a portable terminal device carried by the second user U2. Data of an image captured by a camera of the portable terminal device of the second user U2 may be transmitted to the image providing device 300 according to ad-hoc connection and transmitted to the management server 400 through the communication unit 310 and the network NW or transmitted to the management server 400 through the network NW without passing through the image providing device 300. The display unit 330 is, for example, a display 630 of the TV 600. The display unit 330 displays a streaming image of an image of the first user U1 or the like.

In addition, the image providing device 300 may include a head mount display device (virtual reality device) 700.

Figure 8:
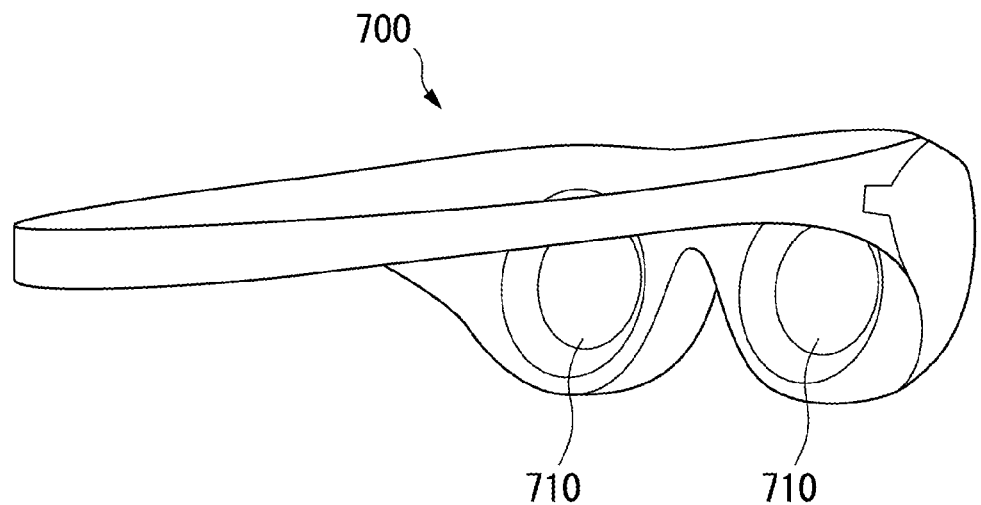
FIG. 8 is a diagram illustrating an example of a configuration in a case including a head mount display device.

FIG. 8 is a diagram illustrating an example of a configuration in a case including the head mount display device 700. In this case, the display unit 330 is a display 710 of the head mount display device 700 and displays a streaming image of an image of the first user U1 or the like.

Further, the display unit 330 may be a display of a terminal device (personal computer) placed in the house of the second user U2.

Referring back to FIG. 1, the storage unit 340 is realized by an HDD, a flash memory, a RAM, a ROM, or the like. The storage unit 340 stores information received from the management server 400, data of images captured by the imaging unit 320, data of a streaming image of the first user U1 or the like displayed by the display unit 330, and the like.

The HMI 350 receives an image providing service starting operation or the like performed by the second user. The HMI 350 is an input device (remote controller) 620 of the TV 600 in the example of FIG. 7. In addition, the HMI 350 may be an input device (a keyboard, a mouse or the like) of a terminal device placed in the house of the second user U2.

Further, the HMI 350 may be a line-of-sight sensor of the head mount display device 700 shown in FIG. 8. The line-of-sight line sensor detects a movement of the line of sight of the second user U2 wearing the head mount display device 700 and receives a viewpoint operation according to a movement of the line of sight of the second user U2. That is, the second user U2 wearing the head mount display device 700 can select a central visual field when a panorama image is sent from the vehicle by moving the line of sight. In addition, the second user U2 may remotely operate at least one of the in-vehicle camera 120A for imaging the inside of the vehicle and the in-vehicle cameras 120B, 120C and 120D for imaging outside of the vehicle by moving the line of sight. Further, the input device 620 of the TV 600, or the like may receive a remote operation of the imaging unit 120 performed by the second user U2.

The control unit 360 is realized, for example, by a processor such as a CPU executing a program. When the second user U2 inputs an image providing service starting operation to the HMI 350 to start an image providing application, the control unit 360 outputs a control signal for causing the communication unit 310 to perform data transmission to the management server 400, a control signal for causing the imaging unit 320 to perform imaging, a control signal for causing the display unit 330 to display a streaming image of the first user U1 or the like, and the like. In addition, the control unit 360 remotely operates the imaging unit 120 on the basis of a movement of the line of sight of the second user U2 detected by the line-of-sight sensor of the head mount display device 700. Further, the control unit 360 may operate the imaging unit 320 on the basis of a movement of the line of sight of the second user U2 detected by the line-of-sight sensor to re-capture an image of the second user U2 in a changed position, for example.

[Management Server]

The management server 400 includes, for example, communication units 410 and 415, storage units 420 and 425, a control unit 430 and a data holding unit 440.

The communication units 410 and 415 are, for example, communication modules for connecting to the network NW. The communication units 410 and 415 perform communication on the basis of communication standards. The communication unit 410 performs communication with apparatuses (e.g., the image providing device 300 and the like) outside the vehicle through the network NW. The communication unit 415 performs communication with the communication unit 110 of the in-vehicle image providing device 100 through the network NW. That is, the management server 400 is configured to connect for communication to the communication unit 110 of the in-vehicle image providing device 100 mounted in the vehicle. For example, the communication unit 415 may receive information on a seat occupancy state in the vehicle detected by the seat occupancy detection unit 140.

The storage units 420 and 425 are realized by an HDD, a flash memory, a RAM, a ROM or the like. The storage unit 420 stores (saves) information transmitted from apparatuses (e.g., the image providing device 300 and the like) outside the vehicle, data of images captured by the imaging unit 320, data of an image of the second user U2 displayed by the display unit 130A, and the like. The storage unit 425 stores (saves) information received from the in-vehicle image providing device 100 and the like, data of images captured (acquired) by the imaging unit 120, data of a streaming image of the first user U1 or the like displayed by the display unit 330, and the like. Information received from the in-vehicle image providing device 100 and the like includes identification (ID) information of the vehicle including the in-vehicle image providing device 100 mounted therein, information on a seat occupancy state in the vehicle, and the like. That is, the storage unit 425 is configured to store information on a seat occupancy state in the vehicle acquired from the communication unit 415.

The control unit 430 is realized, for example, by a processor such as a CPU executing a program. The control unit 430 includes conversion units 430-1, 430-2 and 430-3, and a QoS determination unit 430-4. The conversion unit 430-1 selectively transmits information held by the storage unit 420 to the communication unit 415. The conversion unit 430-1 includes a virtual image generation unit 430A. The virtual image generation unit 430A generates the aforementioned virtual image to be generated by the display unit 130A (e.g., virtual image displayed on the display unit 130A). That is, the management server 400 has a function of cutting out an image of an individual (corresponding to a seat occupancy state of an occupant in the vehicle) from information (image) acquired by an apparatus (image providing device 300) outside the vehicle.

As described above, the storage unit 425 is configured to store information on a seat occupancy state in the vehicle acquired from the communication unit 415. In addition, the conversion unit 430-1 controls the virtual image generation unit 430A on the basis of the information on the seat occupancy state in the vehicle stored in the storage unit 425. That is, the virtual image generation unit 430A generates a virtual image suitable to be generated by the display unit 130A in the vehicle on the basis of the seat occupancy state in the vehicle. The virtual image generation unit 430A performs complementation to generate a virtual image as necessary in order to generate a suitable virtual image. The management server 400 may store (receive from the in-vehicle image providing device 100, the image providing device 300 or the like) 3-dimensional face data and the like as user data in advance of start of a service for generating a virtual image in the vehicle. For example, the management server 400 may perform data processing on image data captured by the imaging units 120 and 320 or the like. The imaging units 120 and 320 and the like may be caused to serve as augmented reality (AR) cameras. The management server 400 may adjust a virtual image in response to a display position (a position at which the display unit 130A generates a virtual image) on the basis of prescribed vehicle shape data.

The conversion unit 430-2 selectively transmits information on a seat occupancy state in the vehicle stored in the storage unit 425 to the communication unit 410. The conversion unit 430-2 includes a person image extraction unit 430B. The person image extraction unit 430B extracts image information corresponding to a specific occupant in the vehicle from the information on the seat occupancy state in the vehicle stored in the storage unit 425. That is, the person image extraction unit 430B has a function of cutting out image data of an occupant in the vehicle received from the in-vehicle image providing device 100 in units of persons. The person image extraction unit 430B cuts an appropriate portion out of an image captured by the imaging unit 120 on the basis of information on a camera arrangement in the vehicle received from the in-vehicle image providing device 100, output data of various sensors in the vehicle, and the like. The portion cut out (extracted) by the person image extraction unit 430B is displayed by the display unit 330 of the image providing device 300.

The conversion unit 430-3 includes a streaming image generation unit 430C. The streaming image generation unit 430C generates a streaming image of an image of the first user U1 or the like on the basis of data of the image of the first user or the like captured by the imaging unit 120.

The quality of service (QoS) determination unit 430-4 performs determination necessary to secure a service quality provided by the management server 400 on the network. The QoS determination unit 430-4 determines, for example, which one of reception from the in-vehicle image providing device 100, transmission to the in-vehicle image providing device 100, reception from the image providing device 300 and transmission to the image providing device 300 will be preferentially performed, and the like. The data holding unit 440 holds, for example, 3-dimensional data of the vehicle including the in-vehicle image providing device 100 mounted therein, information on a camera coordinate system of each camera of the imaging unit 120, and the like. The camera coordinate system is a coordinate system based on a camera which captures images (a coordinate system specific to each camera).

Figure 9:
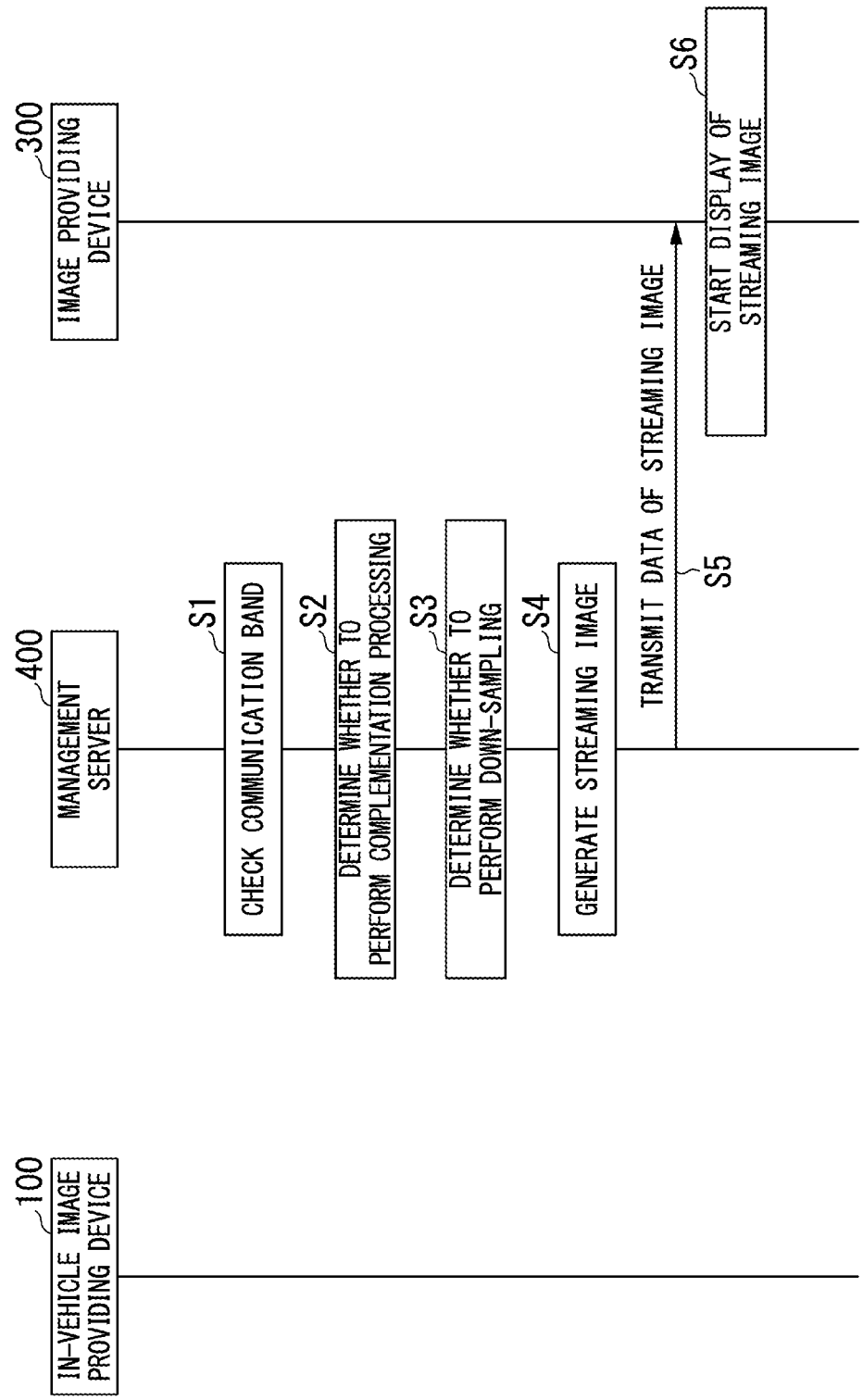
Figure 10:
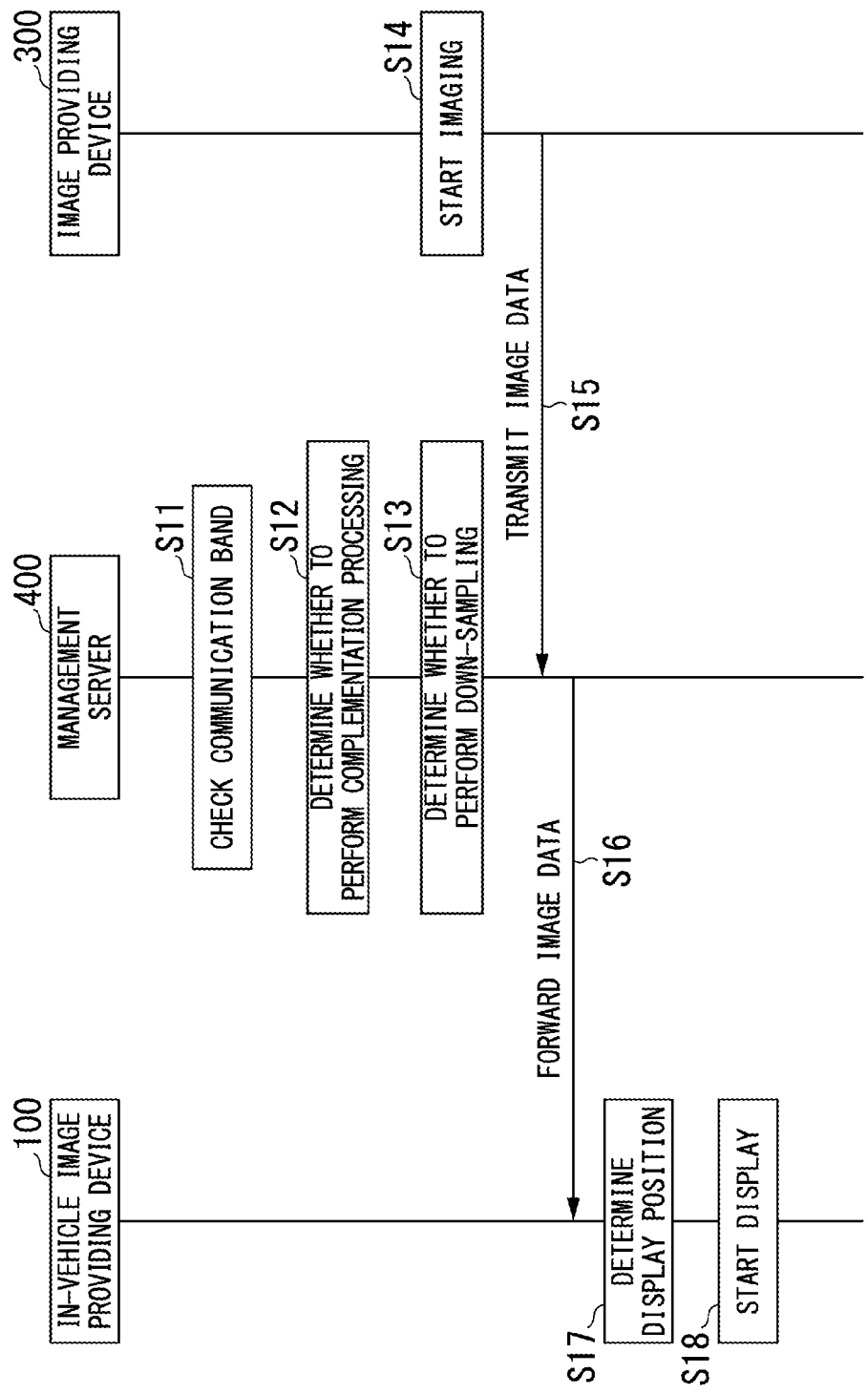
FIG. 10 is a sequence diagram for explaining processing of displaying an image of the second user.

FIG. 9 is a sequence diagram for explaining processing of displaying a streaming image of an image of the first user U1 or the like. FIG. 10 is a sequence diagram for explaining processing of displaying an image of the second user U2. Although processing illustrated in FIG. 9 and processing illustrated in FIG. 10 will be described using different figures for convenience, processing illustrated in FIG. 9 and processing illustrated in FIG. 10 may be simultaneously performed in parallel through bidirectional communication. First, processing illustrated in FIG. 9 is described.

As a premise, the in-vehicle image providing device 100 starts imaging performed by the imaging unit 120 simultaneously with starting of the vehicle, continues imaging performed by the imaging unit 120 (i.e., performs constant imaging) and transmits data of an image captured by the imaging unit 120 to the management server 400, for example. Information on a position and a speed and audio data are added to the image data transmitted to the management server 400.

(Step S1) For example, the management server 400 may check communication bands (speeds) between the management server 400 and the in-vehicle image providing device 100 and between the management server 400 and the image providing device 300.

(Step S2) The management server 400 determines whether to perform complementation processing which will be described later. When the communication band between the management server 400 and the in-vehicle image providing device 100 is narrow, the management server 400 may perform complementation processing for preventing a streaming image displayed in the image providing device 300 from becoming rough, for example. In this complementation processing, the management server 400 uses landscape image data (landscape image data with high resolution) of a corresponding location captured in other vehicles or the like and stored in the storage unit 420 of the management server 400 instead of using landscape image data captured by the in-vehicle cameras 120B, 120C and 120D for imaging the outside of the vehicle of the in-vehicle image providing device 100 in order to generate a streaming image. In this case, a temporal communication lag is complemented.

(Step S3) The management server 400 determines whether to perform down-sampling which will be described later. When the communication band between the management server 400 and the image providing device 300 is narrow, the management server 400 performs down-sampling, for example, when a streaming image is generated. As a result, the amount of data of the generated streaming image can be decreased as compared to a case in which down-sampling is not performed.

(Step S4) The streaming image generation unit 430C of the management server 400 generates a streaming image of an image of the first user U1 or the like. When the aforementioned complementation processing and/or down-sampling have been performed, the streaming image generation unit 430C generates the streaming image by reflecting processing results of the complementation processing and/or down-sampling therein.

(Step S5) The control unit 430 of the management server 400 transmits data of the streaming image of the first user U1 or the like generated by the streaming image generation unit 430C to the image providing device 300.

(Step S6) The display unit 330 of the image providing device 300 starts display of the streaming image of the first user U1 or the like.

The communication unit 110 of the in-vehicle image providing device 100 may directly communicate with the communication unit 310 of the image providing device 300 without passing through the management server 400. Further, when the control unit 180 of the in-vehicle image providing device 100 analyzes a through image of the imaging unit 120 and the first user U1 having a specific relation with the second user U2 is in the through image, the imaging unit 120 may automatically start imaging of the first user U1 or the like.

When the imaging unit 120 automatically starts imaging of the first user U1 or the like, whether a plurality of first users U1 (e.g., a family) are together in the through image may be used as a starting condition. Further, when the imaging unit 120 automatically starts imaging of the first user U1 or the like, an emotional state (e.g., whether the first user U1 is crying or laughing), a health condition (whether the first user U1 has a fever) and the like of the first user U1 in the through image may be used as starting conditions. In addition, when the imaging unit 120 automatically starts imaging of the first user U1 or the like, whether a view around the vehicle in the through image satisfies specific conditions such as a scene, texture and luminance may be used as a starting condition. Further, when the imaging unit 120 automatically starts imaging of the first user U1 or the like, the control unit 430 of the management server 400 may perform remote operation of the imaging unit 120, such as increasing the frequency of imaging performed by the imaging unit 120 on the basis of information such as the location of the vehicle in which the in-vehicle image providing device 100 is mounted, a distance from the location of the portable terminal device 500 carried by the first user U1, surrounding facilities of the vehicle, and clothes of the first user U1 imaged by the imaging unit 120.

The control unit 180 of the in-vehicle image providing device 100 may generate a streaming image of the first user U1 or the like. The second user U2 who has viewed the streaming image of the first user U1 or the like may remotely operate the imaging unit 120 which images the first user U1 or the like by moving the line of sight of the second user U2. When the second user U2 remotely operates the imaging unit 120, the second user U2 may change imaging directions of the in-vehicle camera 120A for imaging the inside of the vehicle and the in-vehicle cameras 120B, 120C and 120D for imaging the outside of the vehicle.

The streaming image generation unit 430C of the management server 400 may edit data of a plurality of images of the first user U1 or the like captured by the imaging unit 120 of the in-vehicle image providing device 100 and generate a digest streaming image of the first user U1 or the like. In addition, the streaming image generation unit 430C of the management server 400 may correct flickering, blur and the like included in an image of the first user U1 or the like captured by the imaging unit 120 on the basis of an output signal of an acceleration sensor of the vehicle in which the in-vehicle image providing device 100 is mounted, and the like.

The management server 400 may disclose content with respect to an image of the first user U1 or the like captured by the imaging unit 120 of the in-vehicle image providing device 100 to a user space of a WEB server in a disclosure range set in advance. When the first user U1 is a parent and child and the second user is a grandparent, a streaming image of the first user U1 or like may be a child care record of parents, for example.

Processing illustrated in FIG. 10 will be described. Processing of steps S11 to S13 of FIG. 10 is the same as processing of steps S1 to S3 of FIG. 9.

(Step S14) The imaging unit 320 of the image providing device 300 starts imaging of the second user U2.

(Step S15) The control unit 360 of the image providing device 300 transmits data of an image (real-time image) of the second user U2 captured by the imaging unit 320 to the management server 400. The control unit 360 may transmit data of a model image of the second user U2 to the management server 400. The control unit 360 may transmit data of an image of the second user U2 captured and recorded in advance by the imaging unit 320 to the management server 400. The transmitted data of the image may be data of a still image or data of a moving image.

(Step S16) The control unit 430 of the management server 400 forwards the data of the image of the second user U2 transmitted from the image providing device 300 to the in-vehicle image providing device 100.

(Step S17) The display unit 130A of the in-vehicle image providing device 100 determines a position at which an imaginary image of the second user U2 will be displayed, for example, on the basis of an imaging result of the in-vehicle camera 120A for imaging the inside of the vehicle. Specifically, the display unit 130A determines whether the imaginary image of the second user U2 needs to be displayed on a mirror or a window because there is no vacant seat in the vehicle or the imaginary image of the second user U2 can be displayed on a vacant seat of the vehicle.

(Step S18) The display unit 130A of the in-vehicle image providing device 100 starts display of the real-time image of the second user U2. The display unit 130A may display a model image, a previously captured and recorded image or the like of the second user U2 instead of the real-time image.

When the in-vehicle image providing device 100 is mounted in a rental car, the control unit 430 of the management server 400 may perform user authentication processing of the first user U1 and the second user U2 when the first user U1 performs an operation of input to the HMI 130 of the in-vehicle image providing device 100 and the second user U2 performs an operation of input to the HMI 350 of the image providing device 300.

The second user U2 may capture an image of the second user U2 again through the imaging unit 320 in order to change an image of the second user U2 displayed by the display unit 130A of the in-vehicle image providing device 100.

The display unit 130A of the in-vehicle image providing device 100 may display a real-time image of the second user U2 in the house of the second user U2 at a travel destination of the first user U1 by means of the vehicle. At that time, the display unit 330 of the image providing device 300 may display a streaming image of the first user U1 or the like at the travel destination. Alternatively, the display unit 330 of the image providing device 300 may display a streaming image of the first user U1 or the like at the travel destination as a digest after the travel of the first user U1 ends. The second user U2 who has viewed the streaming image can experience feeling of traveling with the first user U1.

Hereinafter, a configuration for automated driving of a vehicle will be described. Considering a degree of freedom of looking around of an occupant, and the like, it is desirable that a vehicle of the present embodiment be an automated driving vehicle.

[Vehicle]

Figure 11:
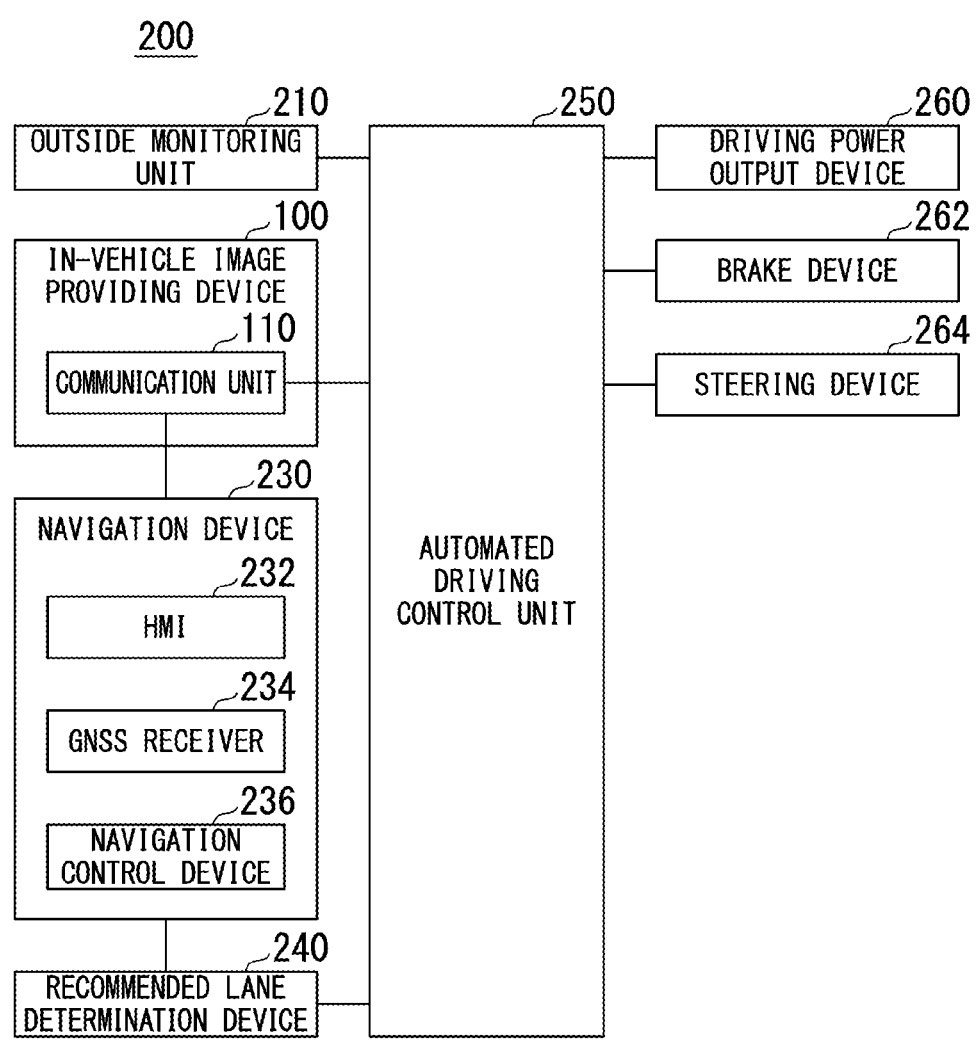
FIG. 11 is a diagram illustrating a configuration for automated driving of a vehicle.

FIG. 11 is a diagram illustrating a configuration for automated driving of a vehicle 200. The vehicle 200 includes, for example, the in-vehicle image providing device 100 including the communication unit 110, an outside monitoring unit 210, a navigation device 230, a recommended lane determination device 240, an automated driving control unit 250, a driving power output device 260, a brake device 262, and a steering device 264.

The outside monitoring unit 210 includes, for example, a camera, a radar, a light detection and ranging (LIDAR) device, an object recognition device which performs sensor fusion processing on the basis of outputs of these components, and the like. The outside monitoring unit 210 estimates types of objects (particularly, vehicles, pedestrians and bicycles) around the vehicle 200 and outputs the estimated types along with information on positions and speeds thereof to the automated driving control unit 250.

Parts of or all of the outside monitoring unit 210 and the imaging unit 120 of the in-vehicle image providing device 100 may be shared.

The navigation device 230 includes, for example, an HMI 232, a global navigation satellite system (GNSS) receiver 234, and a navigation control device 236. The HMI 232 includes, for example, a touch panel type display device, a speaker, a microphone, and the like. The GNSS receiver 234 positions the location thereof (the location of the vehicle 200) on the basis of electric waves arriving from GNSS satellites (e.g., GPS satellites). The navigation control device 236 includes, for example, a CPU and various storage devices and controls the entire navigation device 230. The storage devices store map information (navigation map). A navigation map is a map which represents roads using nodes and links. The navigation control device 236 determines a route from the location of the vehicle 200 positioned by the GNSS receiver 234 to a destination designated using the HMI 232 with reference to the navigation map. In addition, the navigation control device 236 may transmit information on the location and the destination of the vehicle 200 to a navigation server (not shown) using the communication unit 110 and acquire a route returned from the navigation server.

Parts or all of the HMI 232 of the navigation device 230 and the HMI 130 of the in-vehicle image providing device 100 may be shared.

The recommended lane determination device 240 includes, for example, a micro processing unit (MPU) and various storage devices. The storage devices store more detailed high-resolution map information than the navigation map. The high-resolution map information includes, for example, information such as a road width and gradient, a curvature, a position of a signal for each lane. The recommended lane determination device 240 determines recommended lanes which are desirable for traveling along a route input from the navigation device 230 and outputs information on the recommended lanes to the automated driving control unit 250.

The automated driving control unit 250 includes one or more processors such as a CPU and an MPU and various storage devices. The automated driving control unit 250 causes the vehicle 200 to automatically travel such that the vehicle 200 avoids contact with objects whose locations and speeds are input from the outside monitoring unit 210 on the principle of traveling along recommended lanes determined by the recommended lane determination device 240. The automated driving control unit 250 may sequentially perform various events, for example Events include a cruise control event of traveling along the same travel lane at a constant speed, a following travel event of following a preceding vehicle, a lane change event, a merging event, a branch event, an emergency stop event, a tollgate event for passing through a tollgate, a handover event for ending automated driving and switching to manual driving, and the like. Further, there is also a case in which an action for avoidance is planned on the basis of surrounding situations (presence of a neighboring vehicle or pedestrian, lane narrowing due to road construction, and the like) of the vehicle 200 during execution of such events.

The automated driving control unit 250 generates a target trajectory along which the vehicle 200 will travel in the future. The target trajectory includes, for example, a speed element. For example, the target trajectory may be represented as sequential arrangement of points (trajectory points) at which the vehicle 200 will arrive. A trajectory point is a point at which the vehicle 200 will arrive for each predetermined travel distance, and a target speed and a target acceleration for each predetermined sampling time (e.g., every several tenths of seconds) are generated as a part of the target trajectory separately from the trajectory points. In addition, a trajectory point may be a position at which the vehicle 200 will arrive at a predetermined sampling time for each predetermined sampling time. In this case, information on the target speed and the target acceleration are represented as intervals of trajectory points.

Figure 12:
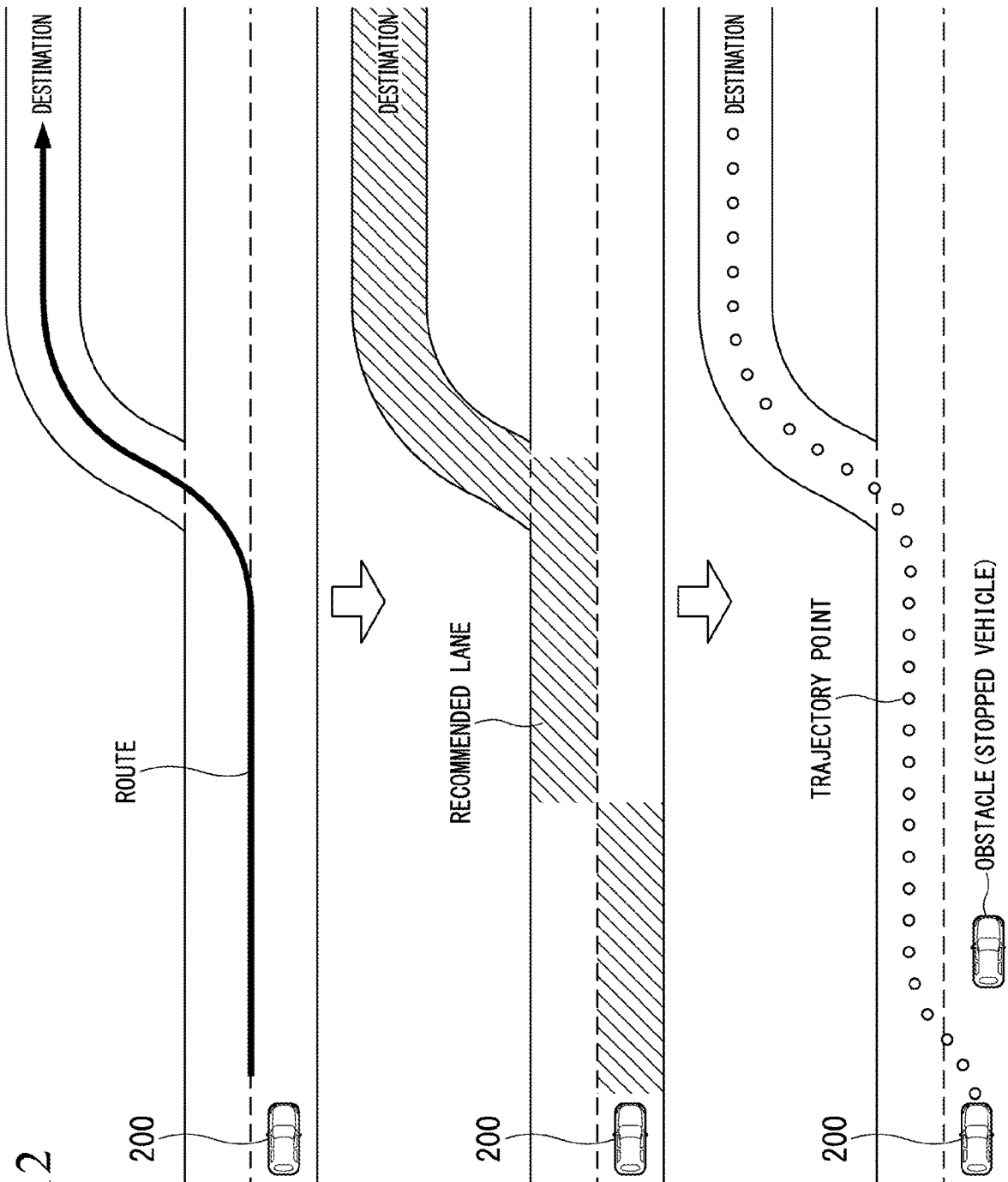
FIG. 12 is a diagram for explaining an automated driving processing procedure.

FIG. 12 is a diagram for explaining automated driving processing procedure. First, a route is determined by the navigation device 230 as illustrated in the upper figure. This route is, for example, a rough route on which lanes are not separated. Next, the recommended lane determination device 240 determines recommended lanes for easy traveling along the route as illustrated in the middle figure. Then, as illustrated in the lower figure, the automated driving control unit 250 generates trajectory points for traveling along the recommended lanes as far as possible while performing avoidance of obstacles, and the like and controls some or all of the driving power output device 260, the brake device 262 and the steering device 264 such that the vehicle travels along the trajectory points (and a subordinate speed profile). Meanwhile, such role allocation is merely an example and the automated driving control unit 250, for example, may perform processing in an integrated fashion.

Referring back to FIG. 11, the driving power output device 260 outputs a travel driving power (torque) for the vehicle 200 to travel to driving wheels. The driving power output device 260 includes, for example, a combination of an internal combustion engine, a motor and a transmission, and a power ECU which controls these components. The power ECU controls the aforementioned components according to information input from the automated driving control unit 250 or information input from a driving operator which is not shown.

The brake device 262 includes, for example, a brake caliper, a cylinder which transmits a hydraulic pressure to the brake caliper, an electric motor which generates the oil pressure in the cylinder, and a brake ECU. The brake ECU controls the electric motor according to information input from the automated driving control unit 250 or information input from the driving operator and causes a brake torque due to a brake operation to be output to each vehicle wheel. The brake device 262 may include a mechanism which transmits an oil pressure generated by operation of a brake pedal included in the driving operator to the cylinder through a master cylinder as a backup. Meanwhile, the brake device 262 is not limited to the above-described configuration and may be an electronically controlled hydraulic brake device which controls an actuator according to information input from the automated driving control unit 250 to transmit an oil pressure of a master cylinder to a cylinder.

The steering device 264 includes, for example, a steering ECU and an electric motor. The electric motor changes the direction of a steering wheel, for example, by applying a force to a rack-and-pinion mechanism. The steering ECU drives the electric motor to change the direction of the steering wheel according to information input from the automated driving control unit 250 or information input from the driving operator.

When automated driving is performed, the imaging unit 120 of the in-vehicle image providing device 100 may image a first-person view (a landscape image viewed by the driver of the vehicle 200) on the basis of the direction of the face (or the direction of the line of sight) of the driver of the vehicle 200, and the display unit 330 of the image providing device 300 may display the image. Further, the second user U2 who has viewed the image displayed by the display unit 330 may remotely operate the traveling direction of the vehicle 200 or transmit an instruction with respect to the traveling direction of the vehicle 200 to the first user U1 through the input device 620. When display of the landscape image viewed by the driver of the vehicle 200 is performed by the display unit 330, the display unit 330 may correct the displayed image on the basis of state quantities (vibration, speed and steering angle) and the like of the vehicle 200.

While forms for embodying the present invention have been described using embodiments, the present invention is not limited to these embodiments and various modifications and substitutions can be made without departing from the spirit or scope of the present invention.

REFERENCE SIGNS LIST

1 Image providing system
100 In-vehicle image providing device
110 Communication unit
120 Imaging unit
120-1 Image processing unit
120A In-vehicle camera for imaging inside of vehicle
120B In-vehicle camera for imaging outside of vehicle
120C In-vehicle camera for imaging outside of vehicle
120D In-vehicle camera for imaging outside of vehicle
130 HMI
130A Display unit
130B Image processing unit
132 Mirror
134 Window
136 Seat
140 Seat occupancy detection unit
150 Connection state detection unit
160 Transmission permission unit 170 Storage unit
180 Control unit
300 Image providing device
310 Communication unit
320 Imaging unit
320A Image processing unit
330 Display unit
330A Image processing unit
340 Storage unit
350 HMI
360 Control unit
400 Management server
410 Communication unit
415 Communication unit
420 Storage unit
425 Storage unit
430 Control unit
430-1 Conversion unit
430-2 Conversion unit
430-3 Conversion unit
430-4 QoS determination unit
430A Virtual image generation unit
430B Person image extraction unit
430C Streaming image generation unit
440 Data holding unit
500 Portable terminal device
600 TV
610 Camera
620 Input device
630 Display
700 Head mount display device
710 Display
NW Network

The invention claimed is:

1. A server system configured to communicatively connect to a processor associated with a vehicle, wherein the vehicle comprises an imaging device, a display device which generates a virtual image of a person, and the communication device which connects for communication to an apparatus outside the vehicle, the server system comprising:
a processor that executes instructions to:
communicate with the apparatus outside the vehicle;
initiate communication with the vehicle;
store information transmitted from the apparatus outside the vehicle;
store ID information of the vehicle and an image acquired by the imaging device; and
selectively convert and transmit the information received from the apparatus outside the vehicle,
wherein prior to transmitting the information received from the apparatus, the processor executes instructions to generate a virtual image to be displayed on the display device,
wherein the processor further executes instructions to store information on a seat occupancy state in the vehicle based on the communication with the vehicle, and based on the seat occupancy state, control display of the virtual image,
wherein the processor further executes instructions to selectively transmit the information on the seat occupancy state to the apparatus outside the vehicle, and
wherein the processor further executes instructions to extract image information corresponding to a specific occupant of the vehicle from the information on the seat occupancy state.

* * * * *